United States Patent
Fyson et al.

(10) Patent No.: US 7,361,379 B2
(45) Date of Patent: Apr. 22, 2008

(54) METHOD OF REGISTERING A SPACER WITH A CONDUCTING TRACK

(75) Inventors: John R. Fyson, Hackney (GB); Christopher B. Rider, New Malden (GB)

(73) Assignee: Eastman Kodak Company, Rochester, NY (US)

( * ) Notice: Subject to any disclaimer, the term of this patent is extended or adjusted under 35 U.S.C. 154(b) by 220 days.

(21) Appl. No.: 11/365,251

(22) Filed: Mar. 1, 2006

(65) Prior Publication Data

US 2006/0199362 A1  Sep. 7, 2006

(30) Foreign Application Priority Data

Mar. 2, 2005  (GB) ................................. 0504263.5

(51) Int. Cl.
*B05D 5/12* (2006.01)
(52) U.S. Cl. .................... 427/108; 438/149; 349/56
(58) Field of Classification Search ............ 438/597, 438/149–164; 349/1–202; 427/108
See application file for complete search history.

(56) References Cited

U.S. PATENT DOCUMENTS 5,707,785 A * 1/1998 Hsieh et al. ............. 430/321
2002/0025391 A1 * 2/2002 Angelopoulos et al. ...... 428/1.4
2004/0188150 A1 * 9/2004 Richard et al. ........... 178/18.01
2006/0262248 A1 * 11/2006 Burberry et al. ............. 349/86
2007/0269589 A1 * 11/2007 Fyson et al. ................ 427/108

FOREIGN PATENT DOCUMENTS

WO      WO 00/38163      6/2000

* cited by examiner

*Primary Examiner*—Kiesha Rose
*Assistant Examiner*—Eric W Jones

(57) ABSTRACT

A method of producing a relief structure on a patterned conductor comprises the steps of; coating a layer of conductive material onto a transparent substrate, coating a layer of metal onto the layer of conductive material, coating a layer of photoresist onto the layer of metal, curing the layer of photoresist, exposing a desired pattern of transparent conductors through a first mask onto the layer of photoresist, developing the photoresist and simultaneously etching the layer of the conductive material and the layer of metal, exposing a desired pattern of metal conductors through a second mask onto the remaining layer of photoresist, developing the photoresist and etching the layer of metal, applying a further layer of photoresist, curing the further layer of photoresist, exposing the further layer of photoresist thorough the substrate, developing the photoresist and allowing the layer to dry, resulting in a pattern of spacers/reliefs in registration with the metal conductors.

6 Claims, 1 Drawing Sheet

ITO ETCH LINES REGISTERED WITH CELL GAPS IN NEXT STAGE

ITO ETCH LINES REGISTERED WITH CELL
GAPS IN NEXT STAGE

ITO ETCH LINES FROM PREVIOUS STAGE
REGISTERED WITH THESE LINES

METHOD OF REGISTERING A SPACER WITH A CONDUCTING TRACK

CROSS-REFERENCE TO RELATED APPLICATIONS

This application is based on GB Application Serial No. 0504263.5. filed Mar. 2, 2005.

FIELD OF THE INVENTION

This invention relates to display devices, in particular to a method of manufacturing components for a display device.

BACKGROUND OF THE INVENTION

There is often a need to put a spacer into an electronic device to provide a cavity. For instance, U.S. Pat. No. 4,113,360 describes an indicating device for displaying symbols. This device has a plate of fluorescent material which emits light, contained within a light guide. On this is placed a small electrode or other conducting material. Above this is placed a light dispersing material on a spacer such that at rest the dispersing material is held away from the light guides plates. Above the light dispersing material there is a transparent plate with an electrode pattern corresponding to the one on the light guide. By applying a voltage between the electrodes, the light dispersing material can be brought into contact with the light guide, decoupling the light and therefore illuminating the device. Whilst out of contact it remains unlit.

PCT Patent Application, WO 00/38163, describes an improved device whereby a complete display of pixels can be formed that can be addressed using column and row addressing. This structure is shown on a rigid glass support. The column plate has a conductor under a relief over which is stretched a translucent membrane. Above this is a row plate with conductors orthogonal to those on the column plate.

One way of making the relief structure over the top of the conductor is to lay down a light sensitive polymer on top of the device covering the conductors and underlying support and then to expose this to a mask identical or similar to the conductors. However, there are several problems associated with this. These include contacting, registration and differential expansion of the mask and the resist covered device. This can be overcome by putting the mask and device in a vacuum frame or by using careful clamping. Registration can be done laboriously by hand or by a specially designed robot. Differential expansion can be overcome by keeping the temperature and humidity of all components constant at all times. All these operations can be accomplished but at a high cost and time.

U.S. Pat. No. 5,707,785 discloses spacers for liquid crystal displays. It describes using an opaque mask laid down in the pattern of the relief but this has no conductive properties.

PROBLEM TO BE SOLVED BY THE INVENTION

The invention aims to provide a simple method of providing a relief or spacer structure over opaque conductors.

SUMMARY OF THE INVENTION

According to the present invention there is provided a method of producing a relief structure on a patterned conductor comprising the steps of; coating a layer of conductive material onto a transparent substrate, coating a layer of metal onto the layer of conductive material, coating a layer of photoresist onto the layer of metal, curing the layer of photoresist, exposing, through a first mask, a desired pattern of transparent conductors onto the layer of photoresist, developing the photoresist and simultaneously etching the layer of the conductive material and the layer of metal, exposing, through a second mask, a desired pattern of metal conductors onto the remaining layer of photoresist, developing the photoresist and etching the layer of metal, applying a further layer of photoresist, curing the further layer of photoresist, exposing the further layer of photoresist thorough the substrate, developing the photoresist and allowing the layer to dry, resulting in a pattern of spacers/reliefs in registration with the metal conductors.

ADVANTAGEOUS EFFECT OF THE INVENTION

The method of the present invention uses the metal conductor pattern as a mask when creating the relief, or spacer, pattern. Using the metal conductor as the mask saves a masking step and ensures registration of the structure with the conductors. These are significant advantages.

BRIEF DESCRIPTION OF THE DRAWINGS

The invention will now be described with reference to the accompanying drawings in which.

DETAILED DESCRIPTION OF THE INVENTION

Figure 1:
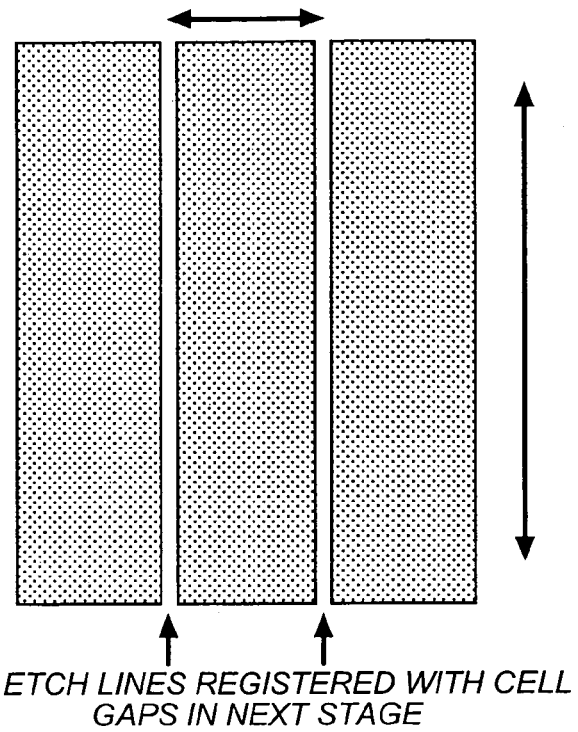
FIG. 1 illustrates the conductive layer etch mask.

The structure manufactured in accordance with the invention comprises a substrate over which is coated a layer of conductive material. The substrate is transparent. The material forming the conductive layer is preferably inorganic. However, this is not an essential feature of the invention. A suitable material for the conductive layer is indium tin oxide (ITO). It will be understood by those skilled in the art that this is an example only and that any suitable material may be used for the conductive layer. A layer of metal is then coated over the conductive layer. This layer of metal reduces the electrical resistance of the layer of conductive material. The metal may be silver but it will be understood by those skilled in the art that any suitable metal may be used. A layer of positive photoresist is then coated above the metal layer.

The layer of photoresist is cured and then exposed through a mask to the desired pattern of the metal conductors (bus bars). The resist is subsequently developed. Where light has shone onto the photoresist it becomes soft and is removed. An etchant is then applied which removes the exposed areas of both the metal layer and the conductive layer. Suitable etchants that would etch both the metal layer and the conductive layer would be any oxidising acidic etch such as dilute chromic acid or acid permanganate. These are examples only and the person skilled in the art will understand that any suitable etchant may be used. After the etching is complete a pattern of etched inorganic conductors are left on the substrate. At this stage the etched inorganic conductors are topped with a layer of metal.

What remains of the layer of photoresist is then exposed, through a second mask, to the desired pattern of the spacers and the metal pattern underneath, the metal pattern being the same as the spacers. The mask can be registered with the metal strips left by the first etching to ensure accurate positioning. More of the photoresist layer becomes soft and is removed. A further etchant is applied which removes the exposed part of the metal layer. This further etching results in the removal of the layer of metal from the top of some of the inorganic conductors. This allows light to travel through the conductive layer at these areas. A different etchant is generally used after this second exposure to ensure that the conductive layer is not further etched as well as the metal layer. An example would be a mixture of iron (III) EDTA and a metal complexing agent. However, a fast acting etchant could be used on the metal for a short time such that the conductive layer is not significantly etched at this point. It is preferable that any remaining resist is removed at this stage.

A layer of dielectric material may be then coated onto the etched structure. This is not essential to the invention. An example of a suitable dielectric material is epoxy resin. However, it will be understood by the person skilled in the art that the invention is not limited to this particular dielectric material. The layer of dielectric is dried and cured.

A further layer of positive photoresist may then coated on top of the layer of dielectric material. It may be the same photoresist as used earlier but it is not essential that this is so. The resist may be liquid, as described in the example below, or a so called dry resist that is applied from a sheet using heated rollers.

The layer of photoresist is cured. The layer is then exposed through the substrate, thus using the pattern of the bus bars or metal conductors as the mask. Since the layer of photoresist is exposed through the transparent substrate the exposed areas will be in registration with the exposed areas left by the pattern of the bus bars. Thus, when the resist is developed the pattern of spacers left will be in exact registration with the bus bars.

The layer of resist is developed. Where light has reached the layer the photoresist becomes soft and is removed. The application of the photo resist and the subsequent exposure and processing to reveal the relief/spacer structure may be repeated as often as necessary to get the required spacer thickness.

The structure obtained by the method described above can be used in any display device in which conductive tracks underneath a relief pattern is required.

A description of an enabling embodiment follows:

EXAMPLE

Coating

This was a 0.2 micron evaporated silver coated onto 300 ohms/sq ITO on 175 micron transparent PET support. All work was carried on pieces cut to 200×150 mm.

Equipment

Exposure

A RS Components Ltd UV Exposure Unit was used with a sheet of film cassette velvet behind the sample to reduce scatter and improve contact. A timer was used as required. For times less than 30 s the clockwork timer was set for greater than 1 min and the mains switch operated for the desired time. The lamp took approximately 1 second to come on. This was used as a correction factor for short times.

Coating

The coating was carried out on a spirally wound bar coater made by RK Coater Ltd having a coating width of approximately 300 mm. This used a 300×150 mm sheet of smooth cleaned aluminium about 1 mm thick which was taped with masking tape to the soft Estar coating onto the mat of the coater such that the long axis was parallel to the coating direction. The samples were taped to this. The height of the coating roller was set by eye. An inspection lamp was placed behind the required roller and the micrometers adjusted until the roller just touched the sample across the width.

Oven

A standard 'hotbox' oven set at the desired temperature was used. Two hours were allowed for stabilisation.

Registration

The masks were registered visually on a 12"×12" light box with a Wratten 2C on the top to remove UV light. A simple 'linen tester' was used to provide magnification.

Solutions

Silver and ITO Etch

| | |
|---|---|
| potassium dichromate | 1 g |
| sulphuric acid | 100 g |
| water to | 1 litre |

Silver Etch

| | |
|---|---|
| 1.56 moler ammonium iron (III) EDTA solution | 90 ml |
| ammonium thiosulphate | 50 g |
| acetic acid, glacial | 5 ml |
| water to | 1 litre |

Resist Developer

| | |
|---|---|
| sodium hydroxide | 10 g |
| water to | 1 litre |

This was used for both the RS resist and Shipley resist.

Rinse

| | |
|---|---|
| Kodak Photoflo | 0.5 ml |
| water to | 1 litre |

Resists

Silver Bus Bar Resist

RS Components Ltd Aerosol Photoresist (positive working). This was coated using the coater above. The aerosol was sprayed into a sample tube having a volume of approximately 5-10 ml and allowed to stand to warm up and allow the propellant to boil off before coating. This took about 20 minutes NB. One coating could be used for both ITO and then silver etching without a recoat using the positive resist.

Shipley Resist

Shipley™ SP220-7 resist was used. Although designed to be spin coated it was RK coated.

Dielectric

RS Components Ltd. epoxy potting compound was used as follows:

5 g resin was mixed with 5 g hardener in a small vial. To this was added 10 g ethanol using a spatula, stirring until a clear solution was obtained. This was allowed to stand for at least 5 min before use to allow air bubbles to disperse.

Making Silver Bus Bars

RS Resist Coating

To the aluminium sheet on the coater (see above) was taped, at both ends, the silver on ITO coating such that the long axis was parallel to the coating direction. A 12 micron coating bar was attached and the micrometers set so that the bar just touched the coating. The bar was moved to the tape at the far end of the coating.

RS resist (about 0.5 ml) was applied to the coating on the edge of the roller (on the side of the coating direction) with a pipette. The bar was then driven at about 50 mm/s. The coating was allowed to dry in the dark and was then put in the oven at 50° C. for 60 minutes. The coating was allowed to cool in the dark after being taken from the oven. The coating was handled in the dark or subdued tungsten light until exposure.

ITO Etching (Also Removes Takes Silver Over the Top of the ITO)

The coating was exposed to the ITO etch mask, see FIG. 1, centring the coating first. This mask was made by laser exposing a computer drawn image onto high contrast graphic arts material and then processing it in the usual way. The order of the pack when exposing the resist was exposing box/mask/coating (resist side to mask)/black velvet/lid. The lid was closed to ensure good contact. Exposure was for 90 seconds.

The coating was then removed and developed in the developer in a processing dish for 90 s at 21° C. The coating was washed in cold running water in another processing dish for 30 s. The coating was then processed in ITO etch for 240 s at 21° C. before washing again for 30 s. The coating was washed in rinse and hung up to dry after dabbing with a paper towel.

Figure 2:
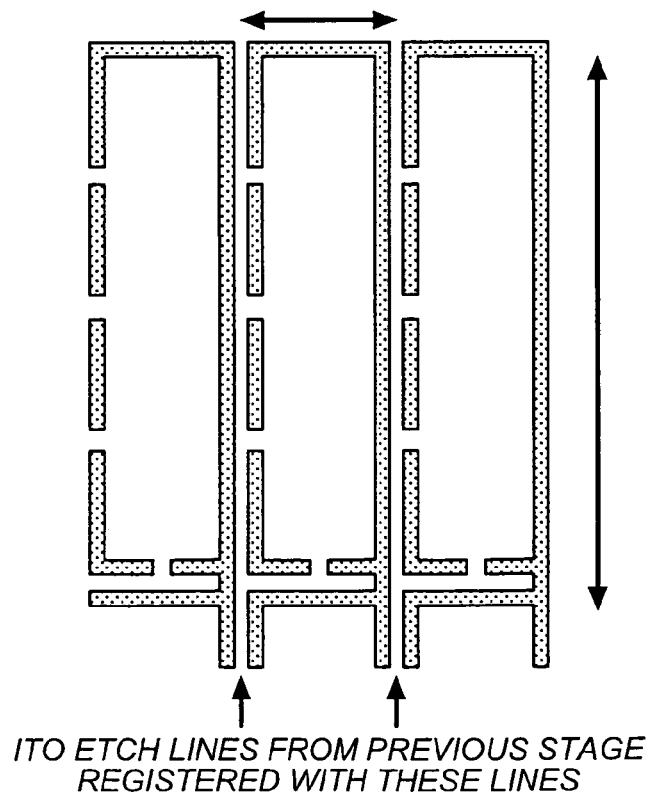
FIG. 2 illustrates the metal layer etch mask.

The resist was used again without recoating. The coating was exposed to a silver etch mask, see FIG. 2, registering this with the previous image using sticky tape to hold the registration. This mask was also made by laser exposing a computer drawn image onto high contrast graphic arts material and then processing it in the usual way. The order of the pack when exposing the resist was exposing box/mask/coating (resist side to mask)/black velvet/lid. The lid of the exposing box was closed to ensure good contact. Exposure was for 50 seconds.

The coating was then removed and developed in the developer in a processing dish for 90 s at 21° C. The coating was washed in cold running water, aiming a jet at the coatings to assist resin removal. The coating was then processed in silver etch for 40 s at 21° C. before washing again for 30 s. The coating was washed in rinse and hung up to dry after dabbing with a paper towel.

Coating the Dielectric

The residue of any resin was removed by running acetone over the etched coating. This coating was taped to the aluminium sheet as for the resist coating, above. A 12 micron bar was selected. The dielectric solution was applied to the coating by the roller and again the bar driven at about 50 mm/s to give the dielectric coating. The dielectric was removed from areas around the central buss bar square using cotton wool soaked in ethanol. A 6 mm boarder was left around the square coated in dielectric. This coating was allowed to stand for 45-75 minutes to allow the alcohol to evaporate before putting in a 90° C. oven for 60 mins to cure. The coating was allowed to cool.

Making the Relief

This coating was taped to the aluminium sheet as for the resist coating, above. A 12 micron bar was selected, put in the coater and adjusted as for the resist above. The Shipley™ resist was applied to the coating by the roller and again the bar pulled down as before to give the second thick resist coating on top of the dielectric. This coating was carried out in subdued tungsten light and the coatings were kept in the dark or under subdued tungsten light.

The coatings were allowed to stand for at least 5 minutes in a well ventilated dark room to allow the solvent to evaporate before putting in an oven for 60 minutes at 90° C. The coating was allowed to cool in a dark box.

The coating was then exposed through the base and bus bars (acting as the photo mask) and was exposed on the UV exposing box for 240 s with a piece of black cassette velvet behind the coating to reduce internal reflections. There was no additional mask.

The coating was then developed in resist developer for 30 s at 20° C. and then washed in cold water for 30 s and then 5 s at 20° C. in a rinse. The coating was allowed to dry.

After drying the treated coating was examined alternately by reflected and transmitted light under a microscope. The relief structure could be seen to be immediately above the opaque silver buss bars. Microscopic cross-sections revealed a structure about 5 microns high above the bus bars and no resist layer in other areas.

The invention has been described in detail with reference to preferred embodiments thereof. It will be understood by those skilled in the art that variations and modifications can be effected within the scope of the invention.

The invention claimed is:

1. A method of producing a relief structure on a patterned conductor comprising the steps of:
    coating a layer of conductive material onto a transparent substrate;
    coating a layer of metal onto the layer of conductive material;
    coating a layer of photoresist onto the layer of metal;
    curing the layer of photoresist;
    exposing, through a first mask, a desired pattern of transparent conductors onto the layer of photoresist;
    developing the photoresist and simultaneously etching the layer of the conductive material and the layer of metal;
    exposing, through a second mask, a desired pattern of metal conductors onto the remaining layer of photoresist;
    developing the photoresist and etching the layer of metal;
    applying a further layer of photoresist;
    curing the further layer of photoresist;
    exposing the further layer of photoresist thorough the substrate; and
    developing the photoresist and allowing the layer to dry, resulting in a pattern of spacers/reliefs in registration with the metal conductors.

2. A method as claimed in claim 1, wherein the etched layer is coated with a layer of dielectric material prior to the application of the further layer of photoresist.

3. A method as claimed in claim 1, wherein the metal is silver.

4. A method as claimed in claim 1, wherein the substrate is flexible.

5. A method as claimed in claim 1, wherein the conducting layer is comprised of an inorganic material.

6. A device manufactured by the method claimed in claim 1.

* * * * *